United States Patent [19]
Madrigal et al.

[11] Patent Number: 5,531,477
[45] Date of Patent: Jul. 2, 1996

[54] METHOD OF FOLDING AN AIRBAG

[75] Inventors: Alexander Madrigal; Michael J. Watson, both of Waterford, Mich.

[73] Assignee: AlliedSignal Inc., Morristown, N.J.

[21] Appl. No.: 471,040

[22] Filed: Jun. 6, 1995

[51] Int. Cl.⁶ .................................................. B60R 21/16
[52] U.S. Cl. ........................................................ 280/743.1
[58] Field of Search ........................... 280/743.1, 743.2, 280/728.1, 732, 731

[56] References Cited

U.S. PATENT DOCUMENTS

| | | | |
|---|---|---|---|
| 4,286,954 | 9/1981 | McArthur et al. | 280/743.1 |
| 5,022,675 | 6/1991 | Zelenak et al. | 280/743.1 |
| 5,140,799 | 8/1992 | Satoh | 280/743.1 |
| 5,162,035 | 11/1992 | Baker | 280/743.1 |
| 5,178,407 | 1/1993 | Kelley | 280/728.1 |
| 5,275,435 | 1/1994 | Fischer | 280/743.1 |
| 5,419,579 | 5/1995 | McPherson et al. | 280/743.1 |
| 5,425,551 | 6/1995 | Hawthorn | 280/743.1 |

FOREIGN PATENT DOCUMENTS 52-77338  6/1977  Japan .................................. 280/743.1

*Primary Examiner*—Paul N. Dickson
*Attorney, Agent, or Firm*—Markell Seitzman

[57] ABSTRACT

A method of folding an airbag is provided for limiting allowable travel of the first portion of the airbag face panel as the airbag is deployed and for causing complete filling of the airbag prior to engagement with a vehicle occupant. The airbag includes a first end adapted to envelop an inflator. The airbag is laid substantially flat, with the first portion of the airbag face panel closely adjacent the first end. The remainder of the airbag is subsequently collapsed over the first portion while the first portion remains closely adjacent the first end.

4 Claims, 3 Drawing Sheets

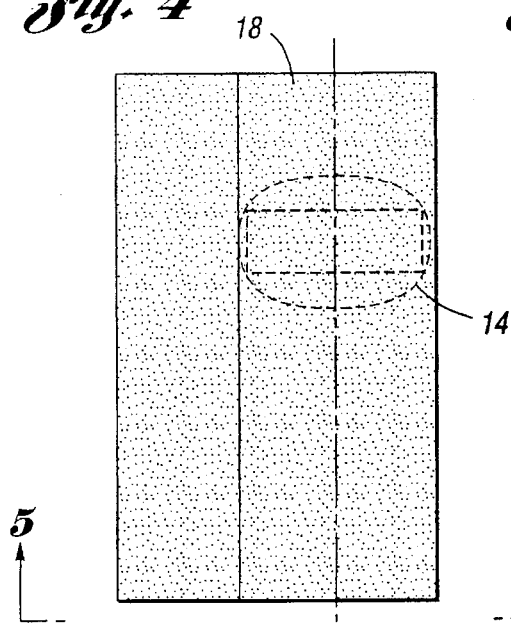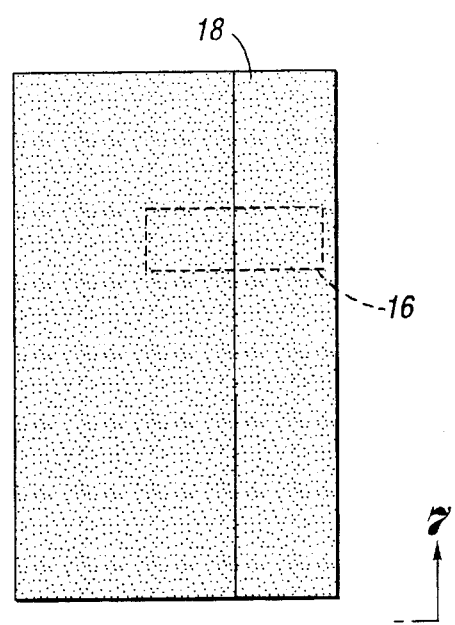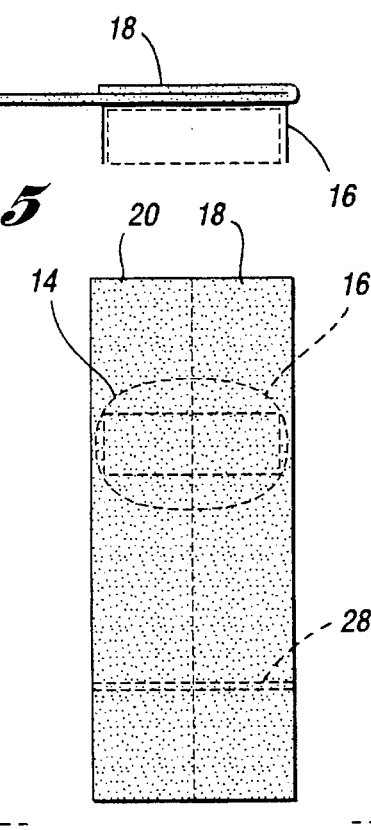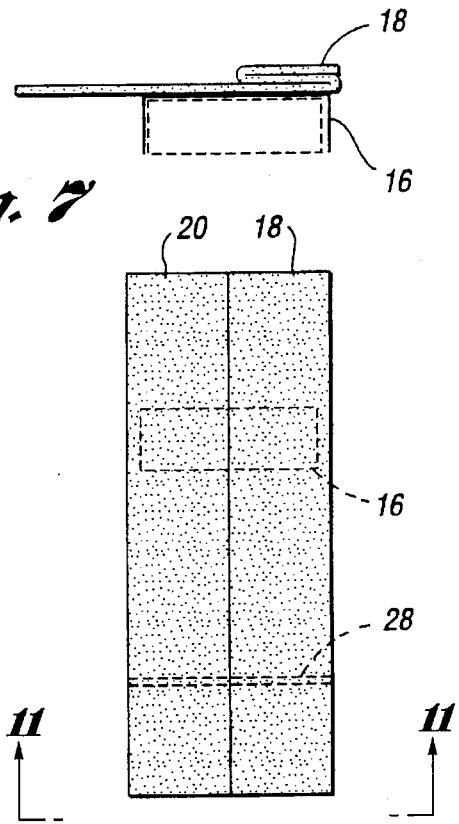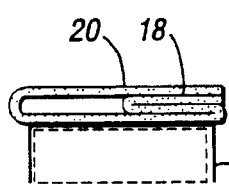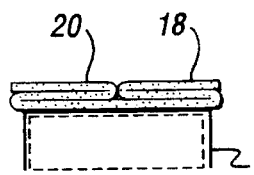

5,531,477

METHOD OF FOLDING AN AIRBAG

TECHNICAL FIELD

The present invention relates to vehicle airbags and, more particularly, to a method of folding an airbag to cause the airbag to fill completely prior to engagement with a vehicle occupant.

BACKGROUND ART

Airbags are commonly used in vehicles for energy absorption in high energy impact situations. A common problem experienced with airbags is the tendency to prematurely contact the occupant prior to complete filling of the airbag. This problem arises when the airbag fills quickly in the direction of the occupant prior to lateral filling of the side portions of the airbag. This causes elongation of the airbag and the face panel of the airbag extends rapidly toward the vehicle occupant.

A common method for eliminating this problem in prior art assemblies is the use of a tether which temporarily restricts the extended length of the airbag. Typically, a tether is disposed within the bag and connects the face panel of the bag to an inflator assembly. The tether limits allowable travel of the face panel of the bag in order to prevent the face panel from prematurely contacting a vehicle occupant. The tether arrangement is successful in causing the airbag to fill completely prior to engagement with an occupant, however, it results in a costly manufacturing process.

Accordingly, it is desirable to control the filling of the airbag and to reduce allowable travel of the face panel of the airbag without the use of airbag tethers.

DISCLOSURE OF THE INVENTION

This invention contemplates a method of folding an airbag in a manner which places a first portion of the airbag face panel closely adjacent the inflator, and the remainder of the airbag is folded over the first portion. In this configuration, the airbag tends to deploy first laterally in order to limit allowable travel of the first portion of the airbag face panel.

This invention also contemplates a method of folding an airbag in a manner to cause complete filling of the airbag prior to engagement with a vehicle occupant. The airbag includes a first end adapted to receive an inflator and a face panel having a first portion. The method comprises laying the airbag substantially flat with the first portion of the airbag closely adjacent the first end. The remainder of the airbag is subsequently collapsed over the first portion. This configuration causes the airbag to first deploy laterally to reduce allowable travel of the first portion in order to prevent premature occupant contact by the first portion as the airbag is deployed.

This invention further contemplates an airbag subassembly for use with a vehicle and its occupants. The subassembly comprises an inflator and an airbag fixed with respect to the inflator. The airbag has an occupant engagement portion and an untethered inflatable portion. The occupant engagement portion overlays the inflator and the inflatable portion is repeatedly folded on itself with respect to the inflator. The resultant folded inflatable portion sufficiently closely overlays the occupant engagement portion so that the inflatable portion inflates before the occupant engagement portion engages the occupant.

An object of the present invention is to provide a method of folding an airbag which causes complete filling of the airbag prior to engagement with the occupant without the need for tethers.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 4 shows a schematically arranged top plan view of an airbag with a first side portion folded over the first portion of the face panel in accordance with the present invention;

FIG. 5 shows an elevational end view of the deflated airbag taken along line 5—5 of FIG. 4;

FIG. 6 shows a schematically arranged top plan view of an airbag with the first side portion collapsed or return folded in accordance with the present invention;

FIG. 7 shows an elevational end view of the deflated airbag taken along line 7—7 of FIG. 6;

FIG. 8 shows a schematically arranged top plan view of an airbag with a second side portion folded over the first portion of the airbag face panel in accordance with the present invention;

FIG. 9 shows an elevational end view of the deflated airbag taken along line 9—9 in FIG. 8;

FIG. 10 shows a schematically arranged top plan view of an airbag with the second side portion collapsed or return folded to form an elongated folded airbag in accordance with the present invention;

FIG. 11 shows an elevational view of the elongated folded airbag taken along line 11—11 of FIG. 10;

DETAILED DESCRIPTION OF THE PREFERRED EMBODIMENT

Figure 1:
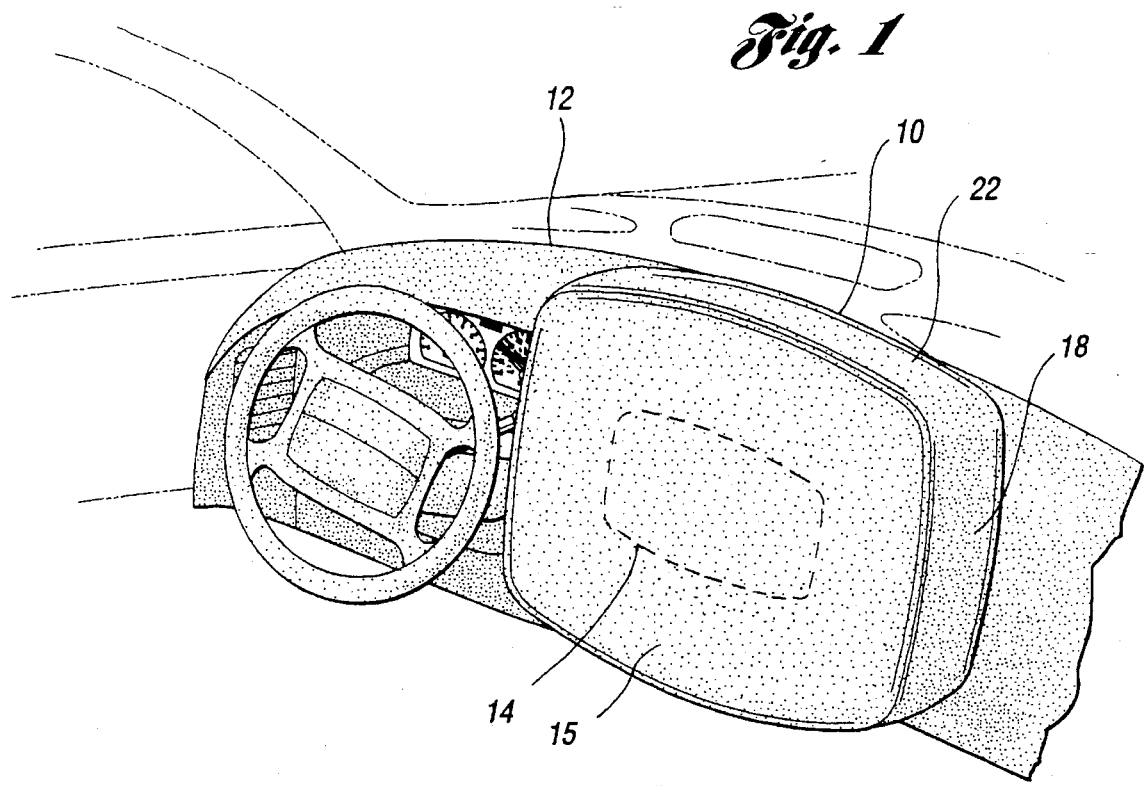
FIG. 1 shows a frontal perspective view of an airbag deployed in a vehicle in accordance with the present invention.

FIG. 1 shows an airbag 10 deployed in a vehicle 12. When folded in accordance with prior art methods, the airbag may elongate and the first portion 14 of the airbag face panel 15 may extend to strike the vehicle occupant prior to complete filling of the airbag. The method of folding an airbag shown in FIGS. 2–16 eliminates this problem by causing proper filling of the airbag in a manner to limit allowable travel of the first portion 14 of the face panel 15 and to encourage complete filling of the airbag prior to engagement with the vehicle occupant.

Figure 2:
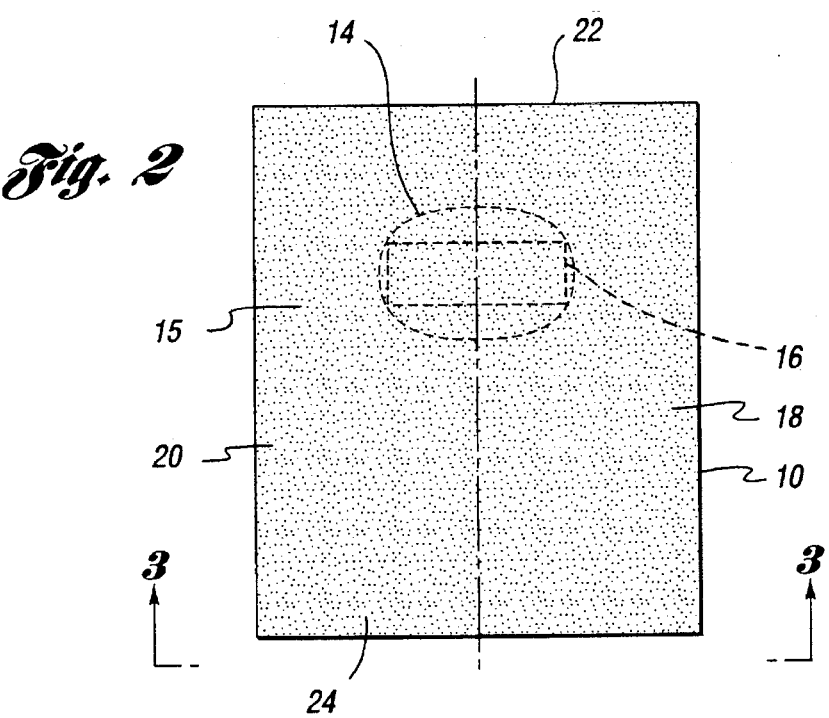
FIG. 2 shows a schematically arranged top plan view of a deflated airbag laid substantially flat prior to folding in accordance with the present invention.
Figure 3:
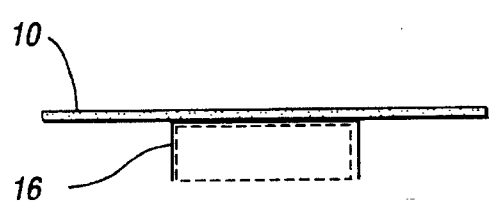
FIG. 3 shows an elevational view of one end of the deflated airbag taken along line 3—3 of FIG. 2.

FIGS. 2 and 3 show an airbag 10 laid substantially flat with the first portion 14 of the face panel 15 closely adjacent the inflator 16. The airbag 10 includes side portions 18,20, a top portion 22, and a bottom portion 24.

FIGS. 4 and 5 show the first step of folding the first side portion 18 over the first portion 14 of the airbag face panel.

As shown in FIGS. 6 and 7, the side portion 18 is then collapsed to a width equal to approximately ½ the length of the inflator 16.

The second side portion 20 is then folded over the first portion 14 of the face panel 15 and over the collapsed first side portion 18, as shown in FIGS. 8 and 9.

At this point, the second side portion 20 is collapsed to a width approximately equal to ½ the length of the inflator 16, as shown in FIGS. 10 and 11. The collapsed side portions 18,20 combine to form a total collapsed width substantially equal to the length of the inflator 16.

Figure 12:
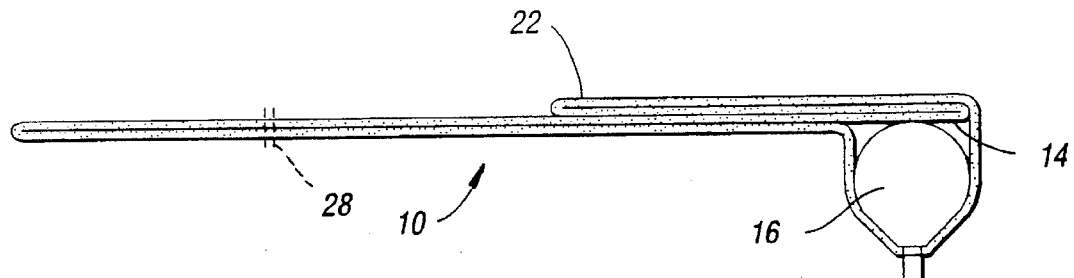
FIG. 12 shows a side elevational view of the elongated folded airbag with the top portion of the folded airbag over the first portion of the airbag face panel in accordance with the present invention.
Figure 13:
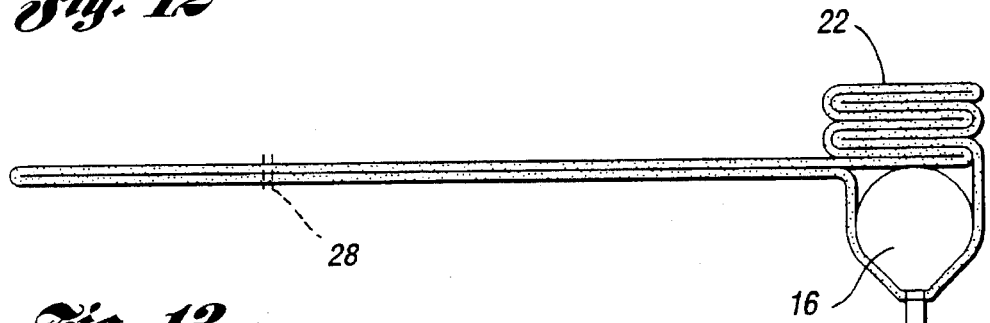
FIG. 13 shows a side view of an airbag with the top portion of the elongated folded airbag collapsed or twice return folded in accordance with the present invention.

FIG. 12 shows a side view of the airbag 10 disposed about the inflator 16. The top portion 22 is folded over the first portion 14. Then, as shown in FIG. 13, the top portion 22 is collapsed to a width approximately equal to the width of the inflator 16.

Figure 14:
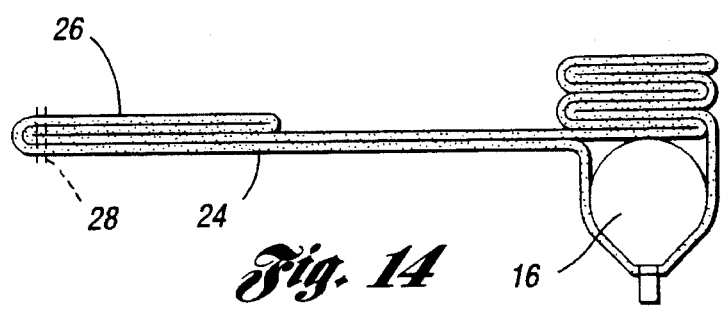
FIG. 14 shows a side elevational view of an airbag with a peripheral portion of the bottom portion of the elongated folded airbag folded toward the first portion in accordance with the present invention.

As shown in FIG. 14, the sew line 28 connects the bottom portion 24 to the portion of the airbag which envelops the inflator 16. The sew line 28 is used as a reference line for folding. The peripheral portion 26 of the bottom portion 24 is then folded over at the sew line 28 to a width approximately equal to twice the width of the inflator 16.

Figure 15:
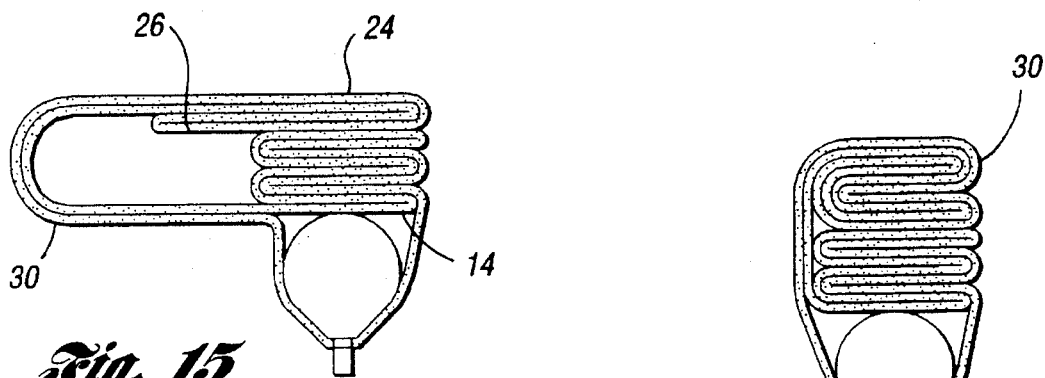
FIG. 15 shows a side elevational view of an airbag with the folded bottom portion folded over the first portion to form a bubble fold portion in accordance with the present invention.
Figure 16:
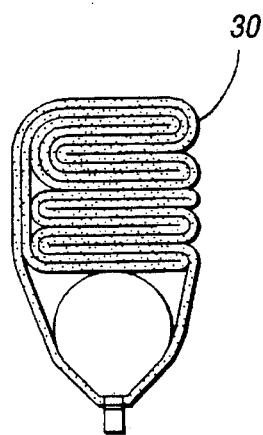
FIG. 16 shows a side elevational view of an airbag with the bubble fold portion closed as it is folded over the first portion in accordance with the present invention.

As shown in FIG. 15, the folded bottom portion and peripheral portion 26 are then folded toward the first portion 14 to form a bubble portion 30. The bubble portion 30 is then collapsed over the remainder of the folded airbag, as shown in FIG. 16.

Figure 17:
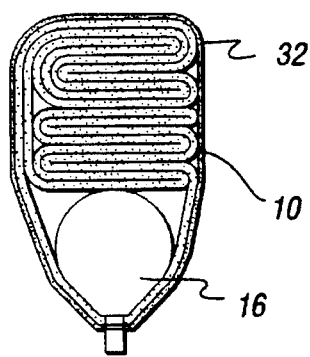
FIG. 17 shows a side view of the folded airbag of FIG. 16 encased in a paper cover in accordance with the present invention.

Finally, FIG. 17 shows a perforated paper cover 32 which encloses the folded airbag 10 and inflator 16.

This method of folding causes proper filling of the airbag. The airbag will first deploy laterally as the airbag fills, first filling the sides and top and bottom portions thereby reducing allowable travel of the first portion 14 of the face panel 15. Also, prior to engagement with a vehicle occupant, the airbag will fill completely. The bubble portion 30 fills first, and the adjacent portion of the bag stiffens and forms a reaction surface from which the remaining segments of the bag are thrust outward. The bottom portion 24 then fills, and the top 22 and side portions 18,20 follow. In this manner, the bag fills laterally rather than elongating, thereby limiting travel of the first portion 14 of the face panel 15 to prevent premature engagement with a vehicle occupant.

While the best mode for carrying out the invention has been described in detail, those familiar with the art to which this invention relates will recognize various alternative designs and embodiments for practicing the invention. Thus, the above-described preferred embodiment is intended to be illustrative of the invention which may be modified within the scope of the followed appended claims.

What is claimed is:

1. A method of folding a vehicle airbag having a first end, for enveloping an elongated, substantially cylindrically shaped inflator of length and width, and top and bottom portions as well as side portions that extend from the first end, wherein the bottom portion includes a peripheral portion and a face panel that extends between the top, bottom and side portions, the face panel being engagable with a vehicle occupant and having a first portion, the method comprising:

laying the airbag substantially flat, with the first portion closely adjacent the first end;

folding the side portions toward the first portion and collapsing the side portions to form a total collapsed width substantially equal to the length of the inflator;

folding the top portion toward the first portion and collapsing the top portion to a width substantially equal to the width of the inflator;

folding the peripheral portion of the bottom portion to a width substantially equal to twice the width of the inflator;

folding the folded peripheral portion toward the first portion to form a bubble portion; and folding the bubble portion toward the first portion to a width substantially equal to the width of the inflator.

2. The method of folding an airbag of claim 1, said airbag further comprising a reference line formed along said bottom portion, wherein said step of folding the peripheral portion being performed along said reference line.

3. A method for folding a vehicle airbag having a first end adapted to envelop an inflator having an elongated substantially cylindrical shape with a cylinder length and width, the airbag further having top and bottom portions as well as side portions that extend from the first end, wherein said bottom portion includes a peripheral portion and a face panel that extends between the top, bottom and side portions to close the airbag at a remote location from the first end, the face panel being engagable with a vehicle occupant, the method comprising:

laying the airbag flat with the first portion closely adjacent the first end;

folding the side portions toward the first portion and collapsing the side portions to form a total collapsed width substantially equal to the length of the inflator;

folding the top portion toward the first portion and collapsing the top portion to a width substantially equal to the width of the inflator;

said step of folding the bottom portion toward the first portion comprises:

folding the peripheral portion of the bottom portion to a width substantially equal to twice the width of the inflator;

folding the folded peripheral portion over the first portion to form a bubble portion; and folding the bubble portion toward the first portion to a width substantially equal to the width of the inflator.

4. The method of folding an airbag of claim 3, said airbag further comprising a reference line formed along said bottom portion, wherein said step of folding the peripheral portion being performed along said reference line.

* * * * *